United States Patent [19]

Banko

[11] Patent Number: 4,507,976
[45] Date of Patent: Apr. 2, 1985

[54] FLOW METER WITH HALL EFFECT SENSOR AND METHOD

[75] Inventor: William Banko, Bronx, N.Y.

[73] Assignees: Morris Shamos, Bronx; Henry E. Allen, Mamaroneck, both of N.Y.

[21] Appl. No.: 398,215

[22] Filed: Jul. 14, 1982

[51] Int. Cl.³ .............................................. G01F 1/24
[52] U.S. Cl. ............................. 73/861.54; 73/DIG. 3
[58] Field of Search ......... 73/DIG. 3, 861.53–861.57, 73/861.71, 861.74; 324/208, 251; 338/324; 200/81.9 M

[56] References Cited

U.S. PATENT DOCUMENTS

| 299,737 | 6/1984 | Chapin . | |
|---|---|---|---|
| 2,404,361 | 7/1946 | Brewer | 73/861.55 |
| 2,907,897 | 10/1959 | Sander . | |
| 2,987,669 | 6/1961 | Kallmann . | |
| 3,060,370 | 10/1962 | Varterasian . | |
| 3,357,244 | 12/1967 | English . | |
| 3,575,054 | 4/1971 | Glista . | |
| 3,636,767 | 1/1972 | Duffy . | |
| 3,789,664 | 2/1974 | Bozek | 73/861.56 |
| 3,805,611 | 4/1974 | Hedland . | |
| 3,867,844 | 2/1975 | Shimizu . | |
| 4,107,604 | 8/1978 | Bernier | 324/208 |
| 4,304,136 | 12/1981 | McCabe et al. | 73/861.54 |

FOREIGN PATENT DOCUMENTS

| 2241095 | 3/1974 | Fed. Rep. of Germany | 73/861.74 |
|---|---|---|---|
| 2368699 | 5/1978 | France | 73/861.53 |

OTHER PUBLICATIONS

Hedland Flowmeter, Hedland Products, 1/81.
240 Series Helix, Positive–Displacement Transducers, Fluidyne Instrumentation, 9/80.
Flow Measurement–A State of the Art in Review, Chemical Engineering, 1/80.
Turbine Flow Meter Systems, Flow Technology, Inc., 1/79.
Fuel Oil Flow–Meters, Waukee Engineering Co., Inc., 1978.
Applying Linear Output Hall Effect Transducers, MICRO Switch, Unknown.
MEM Flowmeters, Meter Equipment Manufacturing, Inc., Unknown.
Centry 470 Differential Pressure Transmitters, Leeds & Northrop, Unknown.
Mark X Flowmeter, Ramapoo, Unknown.
Line Meter and Tube Meter, Pennwalt Corp., Unknown.

Primary Examiner—Charles A. Ruehl
Attorney, Agent, or Firm—Finnegan, Henderson, Farrabow, Garrett and Dunner

[57] ABSTRACT

A fluid flow meter comprising a fluid tight housing including an inlet and an outlet; a hollow liner mounted within the housing including at least one slot, the slot for receiving fluid from the inlet and communicating it to the outlet; a magnetic piston slidably positioned within the liner for movement in response to the flow of fluid from the inlet through the slot; and a Hall effect transducer mounted in the housing in substantially side-by-side relation to the piston for producing an electrical signal corresponding to the position of the piston in the cylinder.

6 Claims, 8 Drawing Figures

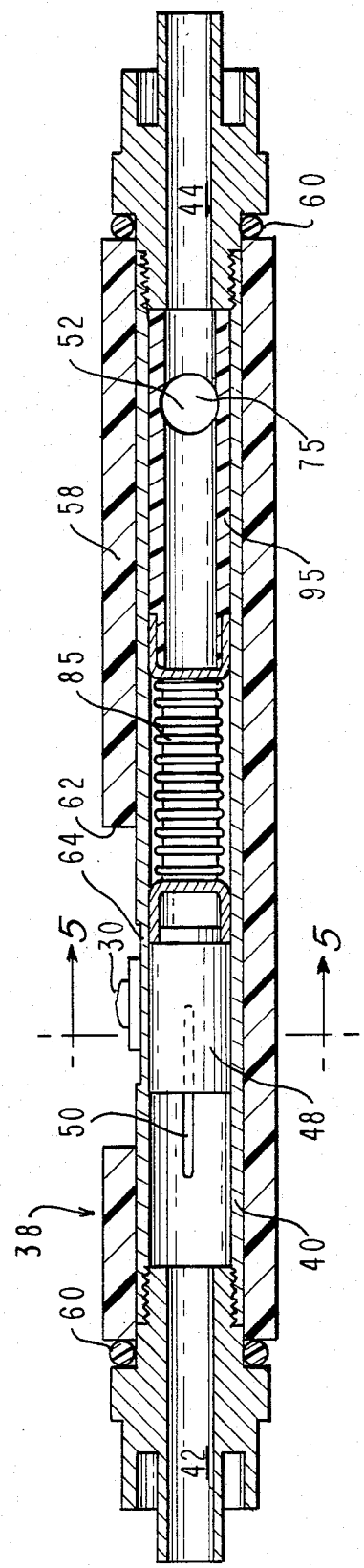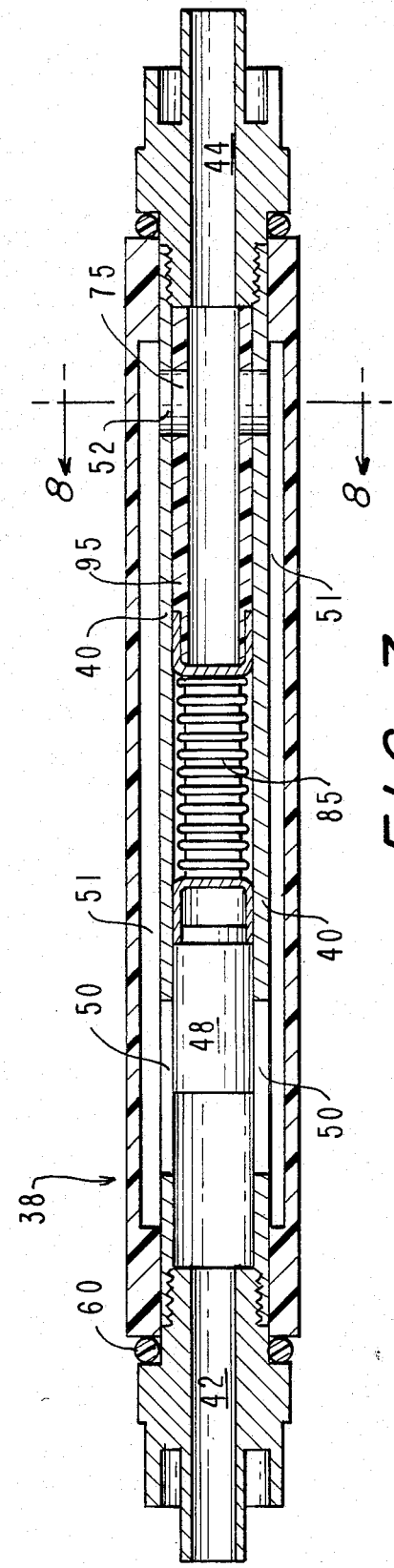

FLOW METER WITH HALL EFFECT SENSOR AND METHOD

FIELD OF THE INVENTION

This invention relates to flow meters, for measuring the flow of fluids. More particularly, this invention relates to meters for accurately measuring fluid flow by measuring the displacement of a movable piston.

BACKGROUND OF THE INVENTION

In the past, substantial efforts have been devoted to the investigation and development of more accurate and less complex flow meters for measuring fluid flow in a variety of circumstances. The accuracy of a flow meter refers to the extent within which the actual flow parameters may differ from the meter reading. Repeatability refers to the ability of a given meter to provide consistent readings over a large number of repetitions. In many situations, the repeatability of a flow meter is more important than its accuracy. For example, in a large industrial process where constant conditions are maintained to provide maximum efficiency, the repeatability of a flow meter may be extremely important.

In recent years, it has become increasingly important to provide a visual readout in conjunction with many types of flow meters. A readout may be accomplished by means of a mechanical arrangement in which a dial or gauge is adjusted in response to changes in flow, or electrical signals may be generated to provide a remote readout through an electrical display or other suitable means. In many situations, a readout capability is considered mandatory, while in other situations, it is generally advantageous.

Despite the advantage provided by a remote readout capability, the additional instrumentation and electronics necessary to provide such a capability have made it uneconomical to provide such a capability for many flow meters used in low cost applications. Such components as signal preamplifiers, pulse rate converters, pulse rate indicators, and range extenders and linearizers greatly add to the cost of a flow meter and often make a visual readout capability economically unfeasible.

In a prior application, Ser. No. 266,622, filed May 22, 1981, of which I am a co-inventor, several varieties of flow meters are described. The flow meters of that prior application, which application is specifically incorporated herein by reference, all have the capability of providing a remote readout. In addition, the flow meters described and claimed in that prior application are extremely accurate and provide an increased measure of repeatability in comparison with prior art flow meters. These advantages are achieved in the invention of application Ser. No. 266,622 by utilizing a magnet or magnetic field producing element in the flow meter, and a Hall effect transducer for sensing the position of the magnetic element in the device. The displacement of the magnet is responsive to the rate of flow or change in pressure of the fluid being measured. Thus, a change in the relative position of the magnet with respect to the Hall effect sensor changes the magnetic flux density sensed by the Hall effect device. The output voltage of the Hall effect sensor varies in accordance with the flux density in the vicinity of the Hall effect sensor. This, the movement of the magnet in response to the rate of flow of the fluid through the flow meter causes a proportional change in the output voltage of the Hall effect sensor. The position of the magnetic element is determined by the difference in pressure on the upstream and downstream surfaces of the magnetic element.

While the flow meters described and claimed in application Ser. No. 266,622 solve many of the problems of the prior art, there are still certain drawbacks to the use of the meters shown as specific embodiments in that application. One of the primary disadvantages is a requirement that the output of the Hall effect sensor must be linearized in order to more correctly represent fluid flow. Linearity refers to a straight line function, while a non-linear relationship may be exponential or logarithmic. Obviously, the closer the function is to being linear, the more accurate will be the representation of the desired function. Although non-linear signals can be linearized electronically or pneumatically, this greatly adds to the cost of producing the device, and may adversely affect accuracy.

In addition to the non-linear nature of the output of the devices described in application Ser. No. 266,622, it has been found that the arrangement of the "slot" on one side of the housing in the specific embodiments described therein produces an unequal distribution of forces on the magnetic element in the flow meter. As a result of this unequal distribution, the magnetic element may encounter frictional and other forces which can reduce the accuracy of measurement of the device. In addition, the relatively large clearance between the magnetic element and the cylinder in which it moves allows fluid to flow between the magnetic element and the cylinder thereby bypassing the slot, and not being measured.

Accordingly, it is a primary object of this invention to improve the accuracy and repeatability of flow meters utilizing a Hall effect sensor.

It is a further object of this invention to economically provide a linearized output from a flow meter which is a direct function of the rate of flow of the fluid through the meter.

Yet another object of the invention is to balance the forces on a magnetic element in a flow meter for more accurate measurement by an accompanying Hall effect device.

A still further object of the invention is to prevent leakage around the magnetic element of a flow meter having a Hall effect device, thereby increasing the accuracy of measurement of the device.

SUMMARY OF THE INVENTION

To achieve the foregoing objects and in accordance with the purpose of the invention, as embodied and broadly described herein, the flow meter of the present invention comprises a housing, including an inlet and an outlet; a hollow liner mounted within the housing, including at least one slot, the slot for receiving fluid from the inlet and communicating the fluid to the outlet; a magnetic piston slidably positioned within the liner for movement in response to the flow of fluid from the inlet through the slot; and transducer means mounted on the housing in substantially side-by-side relation to the piston for producing an electrical signal corresponding to the position of the piston in the cylinder. Preferably, the transducer means comprises a Hall effect transducer. It is also preferred that the liner be cylindrical in shape.

Preferably, the piston has an upstream end and a downstream end, and the flow meter includes barrier means attached to the downstream end of the piston for blocking fluid flow between the piston and the liner to the outlet.

Preferably, the liner includes a pair of opposed elongated slots. The barrier means preferably includes a flexible tubular shaped bellows attached at one end to the piston and fixed at the other end to the liner.

BRIEF DESCRIPTION OF THE DRAWINGS

The accompanying drawings which are incorporated and constitute a part of this specification illustrate several embodiments of the invention and, together with the description, serve to explain the principles of the invention.

OF THE DRAWINGS

Figure 1:
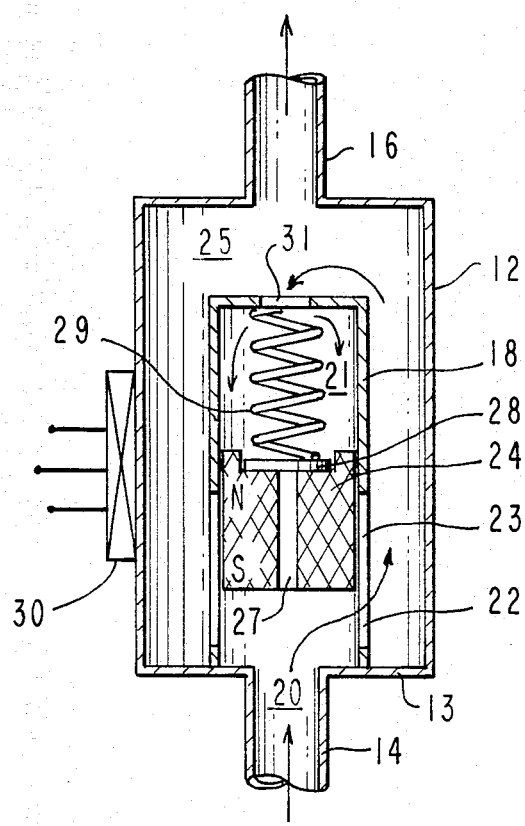
Figure 2:
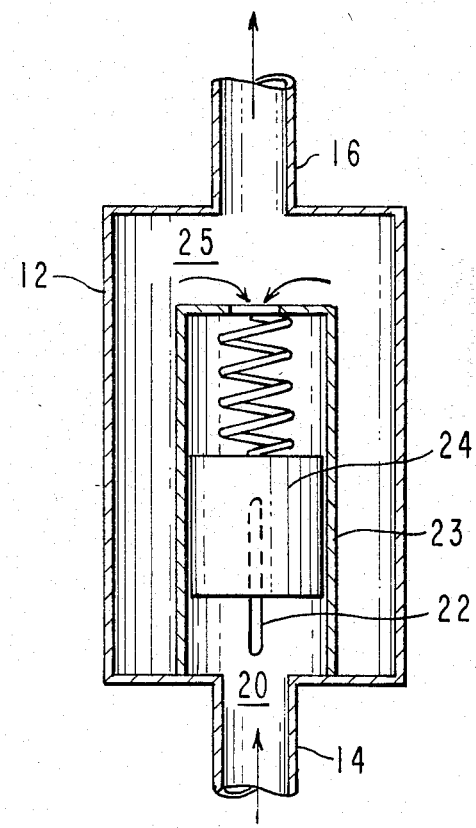
Figure 3:
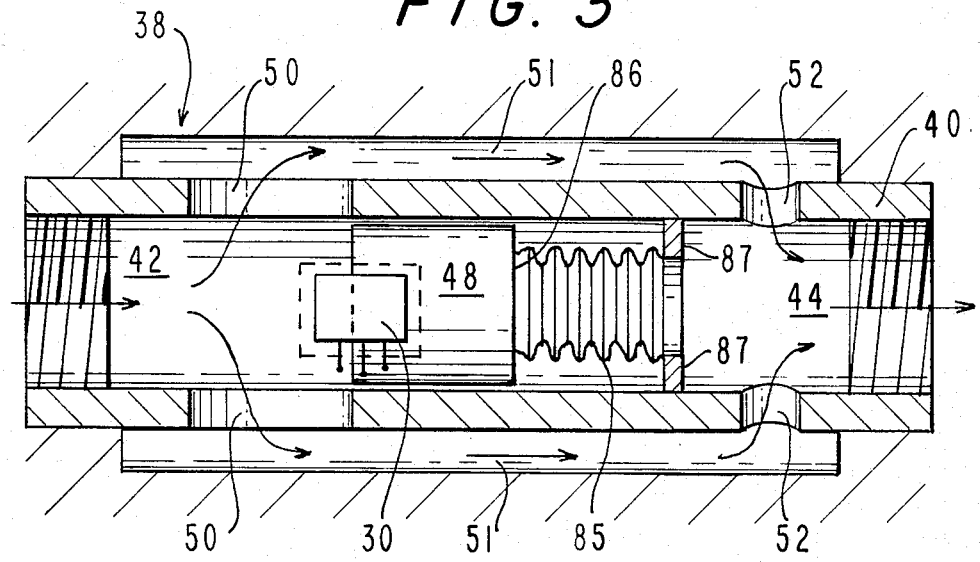
Figure 5:
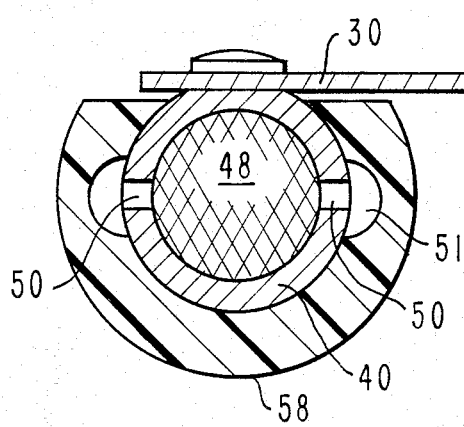
Figure 8:
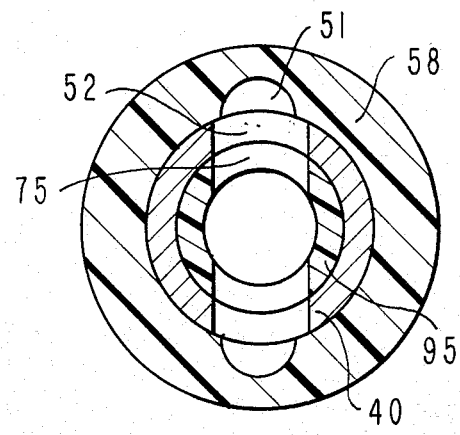
Figure 6:
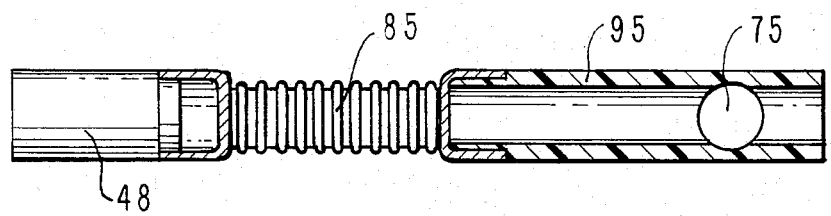

FIG. 1 is an elevational diagrammatic view, partly in section, showing a flow meter in accordance with the invention;

FIG. 2 is a cross-sectional view of the flow meter of FIG. 1;

FIG. 3 is a longitudinal view, partly in cross section, of a further embodiment of the invention;

FIG. 4 is a cross section of still a further embodiment of a flow meter in accordance with the invention;

FIG. 5 is a cross-sectional view taken along the line 5—5 of FIG. 4;

FIG. 6 is an isolated view of the piston and bellows arrangement of the embodiment of FIG. 4;

FIG. 7 is a cross section of the embodiment of FIG. 4 showing the slots, bypass passages and apertures in alignment;

FIG. 8 is a cross-sectional view taken along the line 8—8 of FIG. 7.

DESCRIPTION OF THE PREFERRED EMBODIMENTS

Reference will now be made in detail to the present preferred embodiments of the invention, examples of which are illustrated in the accompanying drawings.

In accordance with the invention, the fluid flow meter of the present invention comprises a fluid tight housing including an inlet and an outlet; a hollow liner mounted within the housing, including at least one slot, the slot for receiving fluid from the inlet and communicating it to the outlet; a magnetic piston slidably positioned within the liner for movement in response to the flow of fluid from the inlet through the slot; and transducer means mounted on the housing in substantially side-by-side relation to the piston for producing an electrical signal corresponding to the position of the piston in the cylinder.

As here embodied, the transducer means comprises a Hall effect transducer. As shown in FIG. 1, which is similar to the embodiment shown in FIG. 5 of co-pending application Ser. No. 266,622, the flow meter comprises a fluid tight housing 12 formed of any suitable material, such as plastic or metal. The housing has an inlet 14 and an outlet 16 at the respective ends thereof. Located within the housing 12 is a hollow liner 18 which is affixed to a bottom wall 13 of housing 12. Liner 18 may also be formed of any suitable material such as metal or plastic.

The liner 18 has an entrance 20 in fluid communication with the inlet 14 of the housing 12. A slot 22 is provided in the wall 23 of the liner 18. The slot 22 is longitudinally shaped, but may be non-linear, varying in width along its length or linear along its length.

As here embodied, the piston comprises a slidable moving magnet 24 located within the hollow liner 18. The magnet 24 is preferably polarized along its length, for example, from north (N) to south (S) as shown in FIG. 1. At the other end of liner 18 is an opening 31 which communicates between the chamber 25 formed by the housing 12 and chamber 21 formed by liner 18. A relief valve 28 is provided at the end of a bore 27 passing through the length of the magnet 24. The operation of the relief valve 28 is described in more detail below.

It is preferred that the magnet 24 be biased toward the inlet 14 by a spring 29, which typically has a biasing force sufficient only to prevent the magnet 24 from moving when the flow meter is tilted from a vertical orientation, as shown.

As embodied herein, a Hall effect transducer 30 is mounted on the outside of the housing 12 in substantially side-by-side relation to the magnet 24. The Hall effect transducer 30 may be mounted by any suitable means, for example, an epoxy adhesive or other bonding agent. The transducer 30 is shown as having three leads, one lead being a voltage input, one a voltage output, and the third which provides a reference potential for the voltage input and the voltage output. A suitable Hall effect transducer which is commercially available is a type 9SS series linear output Hall effect transducer (LOHET) marketed by the Microswitch Division of Honeywell, Inc.

When the Hall effect transducer 30 is mounted as shown in FIGS. 1 and 2, in substantially side-by-side relation with the magnet 24, movement of the magnet 24 relative to the Hall effect transducer 30 produces an output voltage from the transducer which is linearly related to the movement of the magnet 24. This arrangement is also referred to herein as "slide-by-sensing". In slide by sensing, a tightly controlled gap is maintained between the magnet and the Hall effect transducer. As the magnet 24 moves back and forth at the fixed gap, the magnetic field seen by the transducer 30 has one orientation as the sensor approaches the north pole and the opposite orientation as the sensor approaches the south pole. This type of position arrangement results in mechanical simplicity, and can detect position over a relatively long magnet travel. The output characteristic is very close to linear over nearly the entire range of movement of the magnet.

By contrast, the arrangement shown in FIG. 4 of application Ser. No. 266,622, also called unipolar-head-on-sensing, results in a non-linear output from the Hall effect transducer. When the magnet is farthest away from the transducer, the magnetic field at the sensing face is near zero. As the south pole of the magnet approaches the sensor, the magnetic field at the sensing surface becomes stronger and stronger. The output as a function of distance is non-linear, and must be linearized by a suitable electronic circuit such as an operational amplifier.

In operation, as shown in FIGS. 1 and 2, the fluid enters the inlet 14 and passes into the liner 18. The magnet 24 moves against the bias of the spring 29 in response to the pressure exerted by the fluid. Movement of the magnet 24 uncovers the slot 22 to provide an outlet for the major portion of the fluid. The fluid flows through the slot 22 into the chamber 25 in the housing 12, through opening 31 into the chamber 21 in liner 18 and exits through the outlet 16. The differential pressure between the upstream and downstream sides of magnet 24 caused by flow of the fluid through the slot controls the movement of the magnet 24. The bore 27 through the magnet 24 operates as a relief mechanism in the event that the fluid flow overpressurizes within the liner 18. In that event, fluid escapes through bore 27 and check valve 28.

Thus, the invention of the above described embodiment eliminates the need for any additional electronic circuitry to linearize the output voltage of the Hall effect transducer, thereby making the device much more economical to produce, and more simple to operate.

Referring now to FIGS. 3–8, a further embodiment of the invention is illustrated. In this embodiment, the flow meter, generally referred to as 38 is essentially formed from a single tube or liner of material with an outer housing which covers the flow passage. As shown FIG. 3, a tubular member 40 formed of any suitable non-magnetic material such as metal, plastic, or the like, has an inlet end 42 and an outlet end 44. A piston 48 similar to the magnet 24 of FIGS. 1 and 2, is slidably mounted within the tubular member 40.

Preferably, barrier means are attached to the downstream end of the piston for blocking fluid flow between the piston and the tubular member to the outlet. As here embodied, the barrier means includes a bellows 85 attached to the downstream end 86 of the piston 48. As illustrated in FIG. 3, the other end of the bellows 85 is sealingly attached to a ring 87 which prevents fluid from leaking past the piston 48 to the outlet 44.

The tubular member 40 has two symmetrically arranged longitudinal slots 50 adjacent the inlet end 42 of the tubular member 40 on opposite sides of the member 40. The slots 50 have a length generally corresponding to the distance of travel of the piston 48, and may be formed in any suitable shape, depending upon the flow response to be measured. A pair of bypass passages 51 are symmetrically arranged in fluid communication with the slots 50 on the outer surface of the wall of the tubular member 40. A pair of symmetrically arranged apertures 52 are provided in the tubular member 40 adjacent the outlet end 44.

Fluid entering through the inlet 42 displaces the piston 48 thereby uncovering the slots 50. The fluid then passes through the bypass passages 51 and the apertures 52 exiting at the outlet end 44. The differential pressure between the upstream side of the piston 48 and the downstream side 86 thereof controls the movement of the piston 48 as a function of flow. The differential is a result of the constriction of the flow through the slots 50 and passages 51. The bypass passages 51 are formed within a housing 58 which may be plastic or other similar material, and is fastened over the tubular member 40. As shown in FIG. 3, the housing 58 extends over the slots 50 and the apertures 52. The ends of housing 58 are fastened in a fluid tight manner, for example, by O-rings, epoxy, or any other suitable material.

In FIG. 3, the Hall effect transducer 30 is shown as being mounted in slide-by-sensing relation with the piston 48. The transducer 30 may be mounted in an opening on the housing 58 in any suitable manner. A typical arrangement is shown in more detail in FIG. 4.

As described with respect to the embodiment of FIGS. 1 and 2, the cooperation between the piston 48 and the Hall effect transducer 30 is such that the movement of the piston 48 provides a linear output voltage from the Hall effect transducer 30. Accordingly, the flow rate of the fluid is linearly related to the meter reading from the Hall effect transducer 30.

Referring now to FIGS. 4–8, a further embodiment is illustrated. This embodiment is similar to that illustrated in FIG. 3 with additional modifications.

As shown in FIG. 4, tubular member 40 is arranged within a housing 58 in a fluid-tight relation. Inlet 42 and outlet 44 are attached to the tubular member 40 with suitable O-rings 60 therebetween. A magnetic piston 48 is slidably mounted within the tubular member 40 near the inlet end 42.

As best shown in FIG. 5, a pair of symmetrically arranged slots 50 are arranged in the walls of the tubular member 40. Each of the slots 50 communicates with a bypass passage 51 running longitudinally along the outer surface of the tubular member 40 within the housing 58. A pair of symmetrically arranged apertures 52 in the walls of the tubular member 40 are located at the other end of the passages 51.

As shown in FIG. 6, the magnetic piston 48 has a bellows member 85 attached to the downstream side thereof. The bellows member 85 is further connected to a cylindrical seal 95 which is fixed within the tubular member 40. A pair of apertures 75 in the cylindrical seal 95 are symmetrically arranged for alignment with the apertures 52 in the tubular member 40, as shown in FIG. 7. Thus, the fluid entering the inlet end 42 of the tubular member 40 causes the piston 48 to be displaced. Movement of the piston 48 uncovers the slots 50 allowing the fluid to pass through the bypass passages 51, the apertures 52, and the apertures 75 to exit through the outlet opening 44. The cylindrical seal 95 prevents leakage of fluid past the piston 48 to the outlet 44. The fluid from aperture 75 also passes through the cylindrical seal 95 and bellows 85 to act on the downstream side of the piston 48. Thus, the differential pressure caused by the constricted flow controls the position of the piston 48, as discussed previously.

As shown in FIGS. 4 and 5, the Hall effect transducer 30 may be mounted in an opening 62 in the housing 58. A recess 64 may be formed in the tubular member 40 for receiving the Hall effect transducer 30.

As shown in FIG. 8, the bypass passages 51, the apertures 52, the apertures 75 and the outlet of 44 are in direct alignment to form an unimpeded channel from passageway 51 through the outlet 44.

The present invention also includes an improved method of measuring the rate of flow of a fluid. In accordance with the invention, the method of measuring the rate of flow of a fluid comprises the steps of passing the fluid through a confined area; producing a varying magnetic flux at a transducer as a function of the flow of the fluid through the confined area; transducing the flux into an electrical signal from a point substantially parallel to the path of flow of the fluid; and gauging the electrical signal. The method may be practiced by the apparatus described above, or any other suitable apparatus.

It will be apparent to those skilled in the art that various modifications and variations could be made in the structure and method of the invention without departing from the scope and spirit of the invention.

What is claimed is:

1. A fluid flow meter comprising:
   a fluid tight housing, including an inlet and an outlet;
   a hollow liner mounted within said housing including at least one slot, said slot for receiving fluid from said inlet and communicating said fluid to said outlet;

a magnetic piston slidably positioned within said liner for movement in response to the flow of fluid from said inlet through said slot independent of gravity and spatial orientation; and transducer means mounted on said housing in substantially side-by-side relation to said piston for producing an electrical signal corresponding to the position of said piston in said liner.

2. The flow meter of claim 1 wherein said transducer means comprises a Hall effect transducer.

3. The flow meter of claim 2 wherein said piston has an upstream end and a downstream end, and said flow meter includes barrier means attached to said downstream end of said piston for blocking fluid flow between said piston and said liner to said outlet.

4. The flow meter of claim 3 wherein said barrier means includes a flexible tubular shaped bellows attached at one end to said piston and fixed at the other end to said liner.

5. The flow meter of claim 1 wherein said liner includes a pair of slots, said slots being symmetrically arranged on opposite sides of said liner.

6. A fluid flow meter comprising:

a fluid tight housing including an inlet and an outlet, and a pair of symmetrically arranged longitudinal channels on the inner surface thereof;

a hollow cylinder mounted within said housing including a pair of longitudinal slots, one of said slots for alignment with one end of each of said channels, and a pair of apertures, one of said apertures being aligned with the other end of each of said channels, said slots for receiving fluid from said inlet and communicating it through said channels and said apertures to said outlet;

a magnetic piston slidably positioned within said cylinder for movement in response to the flow of fluid from said inlet through said slot; and transducer means mounted on said housing in substantially side-by-side relation to said piston for producing an electrical signal corresponding to the position of said piston in said cylinder.

* * * * *